US005500136A

United States Patent [19]
Chadwick

[11] Patent Number: 5,500,136
[45] Date of Patent: Mar. 19, 1996

[54] SIMULATED GOLD AND GEMSTONE MINING OPERATION

[76] Inventor: Galen J. Chadwick, 105 South Dixie Ave., Cookeville, Tenn. 38501

[21] Appl. No.: 295,520

[22] Filed: Aug. 24, 1994

[51] Int. Cl.[6] .......... B01D 37/00

[52] U.S. Cl. .......... 210/805; 210/167; 210/170; 210/194; 209/4; 209/458; 209/500; 209/501; 273/139

[58] Field of Search .......... 209/3, 458, 500, 209/501; 210/167, 173, 170, 194, 777, 805; 266/44, 168; 423/23; 273/139

[56] References Cited

U.S. PATENT DOCUMENTS

| | | | |
|---|---|---|---|
| 1,815,548 | 7/1931 | Covington | 209/458 |
| 2,405,622 | 8/1946 | Thomas | 209/458 |
| 4,319,985 | 3/1982 | Hibbard | 209/458 |
| 5,287,975 | 2/1994 | Chumley et al. | 209/458 |

*Primary Examiner*—Robert A. Dawson
*Assistant Examiner*—Kenneth M. Jones
*Attorney, Agent, or Firm*—Sheldon H. Parker

[57] ABSTRACT

A sluicing operation for entertainment comprises a two portion unit, having storage facilities and sluicing area with at least one trough at approximately a 2° angle. The storage facilities have a water/ore separation unit, precious material holding bin with measuring device, conveyor and ore weighing device. The conveyor transports the precious material and ore to a holding unit where it is dispensed. Pipes circulate the water or ore/water combination. The bottom of the trough can be mesh, the ore filtering through onto a second conveyor where it is carried to an ore receiving area. A flared side sluicing pan with a perforated base separates the highly polished ore and precious material. A controlled artificial river forms a permanent sluicing operation using passive filtration dams with controlled inlet ports. The water is filtered through filtration matting before entering the inlet ports. The riverbed is filled with gemstone and gold enriched sand and gravel. Alternatively the riverbed can be used to maintain aquatic species. The filtration dams can be used to filter pollutants from existing rivers.

21 Claims, 10 Drawing Sheets

FIGURE 7
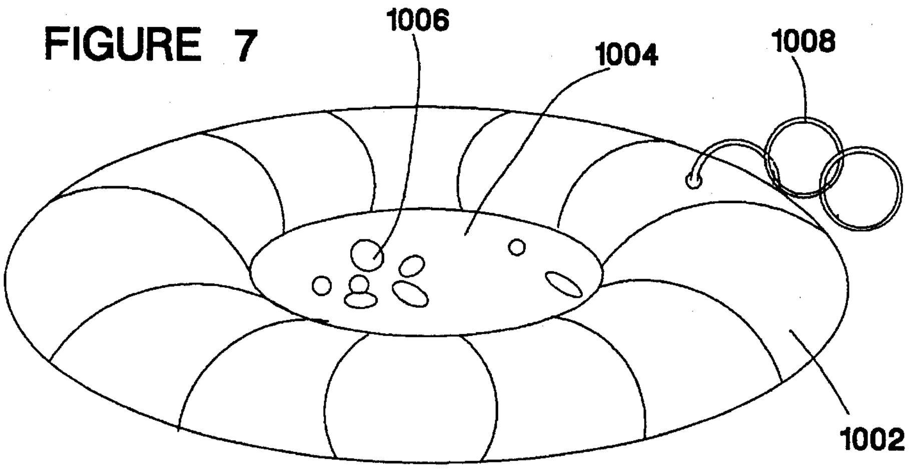
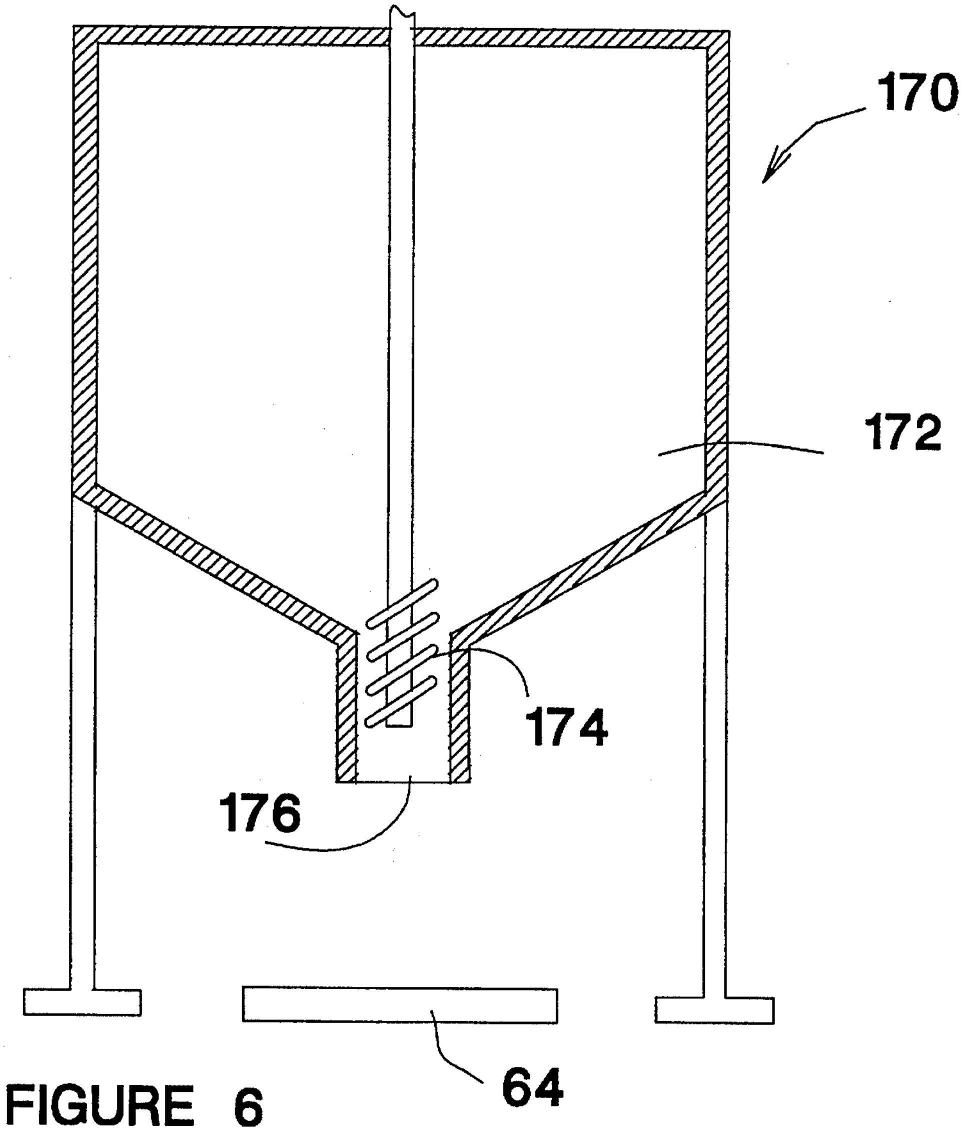
FIGURE 6

SIMULATED GOLD AND GEMSTONE MINING OPERATION

BACKGROUND OF THE INVENTION

1. Field of the Invention

The instant invention discloses mining operations for indoor and outdoor entertainment purposes. In one embodiment, the sluicing operation is transportable and can be easily moved from one location to another. In another embodiment, the mining operation is an artificial river bed with a filtration system.

2. Brief Description of the Prior Art

Mining for gold and gemstones has been a part of the American frontier tradition for more than a century. Theme parks and roadside tourist attractions have incorporated the wild west tradition into their attractions for years, frequently with customer interactive mining.

Mining operations for theme parks can be expensive to build and maintain, especially in view of EPA standards for waste water disposal and sedimentation. This is especially true for the small parks which may not have the funds to build an entire mining operation for customers. State Fairs or other temporary operations have no opportunity to bring this attraction to their customers due to the prior permanency of the operation.

A typical prior art operation would consist of an ore storage area, a sluicing area and an ore holding area. Ore from the storage area is manually placed into bags into which gold or gemstones are placed. The bags are sold at a "store" to customers who then mine for the gold. The ore is washed from the sluicing area to the ore holding area. After customer hours, the ore is shoveled from the holding area and either transported back to the storage area or placed in bags and transported to the store. A measured amount of gemstones must be manually measured and hidden in each bag. The labor required in this type of operation is extensive. The prior art operations also present the problem of water disposal. If water is not recycled it must be disposed of according to EPA regulations. This involves costly transportation and processing. Some fairs, such as the Mid-State Fair in Orlando, Fla. have banned the prior art mining operations due to the problems associated with the water disposal.

The pre-done bags of ore purchased off the shelf gives the customer a feeling of little or no control over their possibilities of obtaining a "good bag". In many instances they are correct in that the owners can, to some extent, control who receives the more valuable bags. Additionally, individually filled bags leaves the gold and/or gemstones accessible to employees, allowing for a greater possibility of theft.

The instant invention overcomes the foregoing problems by disclosing a self-contained, cost effective, automated mining operation. Unlike prior art mining operations, the instant invention does not contaminate the water used in the mining operation. It is for this reason that the Mid-State Fair in Orlando, Fla., only allows the instant invention at the Fair while preventing the attendance of other mining operations.

SUMMARY OF THE INVENTION

A sluicing operation for entertainment comprises a two portion unit, the first portion having mining facilities and the second portion a sluicing area. The mining facilities and the sluicing area can be two, removably connectable units. The mining facilities have a water/ore separation unit, precious material holding bin, a conveyor and ore weighing device.

The precious material can be gold, gemstones, arcade coins, precious materials, or prizes of any kind. The material holding bin is proximate the conveyor and further comprising a measuring device for measuring and depositing the precious material onto the conveyor. The ore weighing device is proximate the conveyor and the separation unit and further comprises an ore retaining area which receives ore from the separation unit. The conveyor transports the precious substance and ore to an ore holding unit where it is dispensed. The sluicing facilities have at least one trough which is along at least a portion of the periphery.

A first water transfer means are connected to the separation unit to receive the water after separation. At least one second water transfer means returns the water/ore combination to a pump which pumps the water/ore combination to the separation unit.

In one embodiment the trough is at approximately a 2° angle with at least one second water transfer means connected to the second end of the trough.

In a second embodiment, mesh forms the bottom of the trough, allowing ore to filter through onto a second conveyor. The conveyor transports the ore to an ore receiving area. A filter prevents the ore from leaving the ore receiving area while allowing water into the at least one second water transfer means.

A sluicing pan having flared sides and a substantially flat perforated base is used to separate the ore and precious material. The perforations of the sluicing pan are slightly greater than the diameter of the grains of ore being used.

The ore used is highly polished to remove angularities and residue. The ore can have, for example, a grain size diameter between approximately 1/16 and 1/2 of an inch.

A permanent sluicing operation in the form of a controlled artificial river having passive filtration dams is disclosed. The base portion of the filtration dams are in contact with the bedrock of the artificial riverbed. The dams have an upstream side and a downstream side with at least one inlet port, proximate the bedrock, extending through the base. The inlet ports are provided with electronic or manual inlet controls to control the quantity of water passing through the inlet ports. Bricks are affixed to the bedrock on the upstream side of the base portion and are covered with a filtration matting to filter the water before entering the inlet ports. Rigid matting covers the filtration matting thereby protecting the filtration matting. The top of the filtration dam has a surface debris catcher to accumulate miscellaneous floating debris. The riverbed is filled with gemstone and gold enriched sand and gravel suitable for sluicing for gemstones and gold. Alternatively, the riverbed can be used as a home for aquatice life, including various fresh and salt water animals and plants, allowing a controlled environment for endangered species. The filtration dams can be placed along an existing river to filter pollutants from the water.

BRIEF DESCRIPTION OF THE DRAWINGS

The advantages of the instant disclosure will become more apparent when read with the specification and the drawings, wherein:

FIG. 6 is a cut-away side view of the gemstone bin of FIG. 5;

FIG. 7 is a perspective view of the mining pan used with the embodiment of FIG. 1;

DETAILED DESCRIPTION OF THE INVENTION

Figure 1:
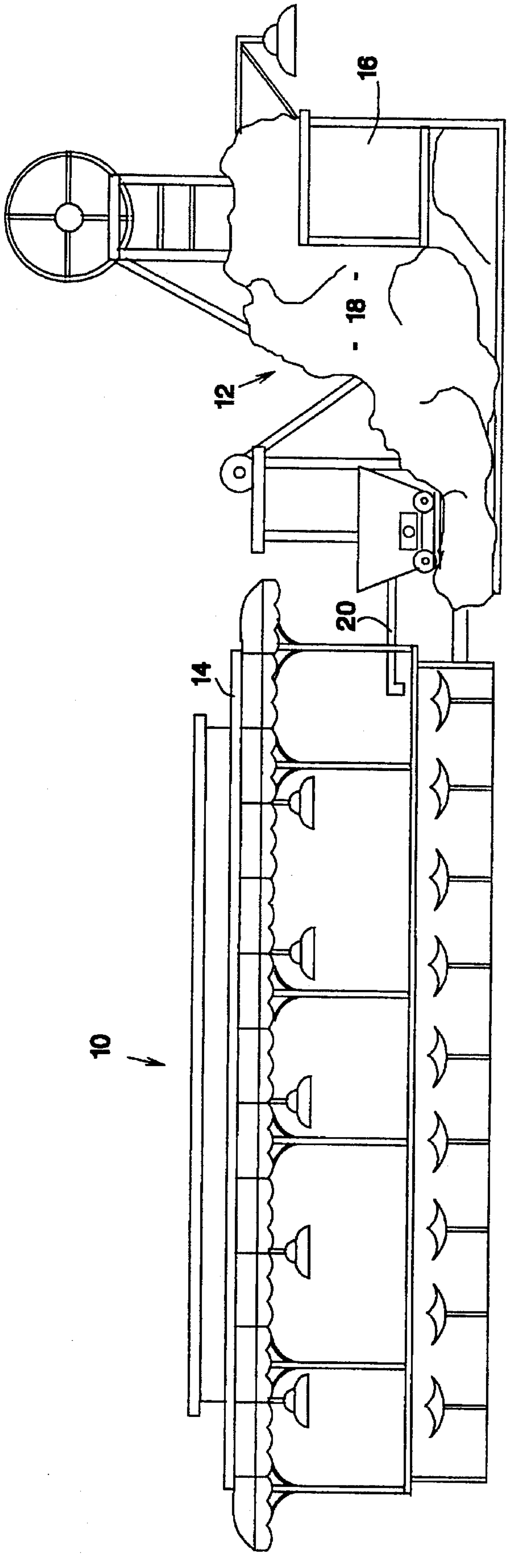
FIG. 1 is a side view of the portable sluicing operation.
Figure 12:
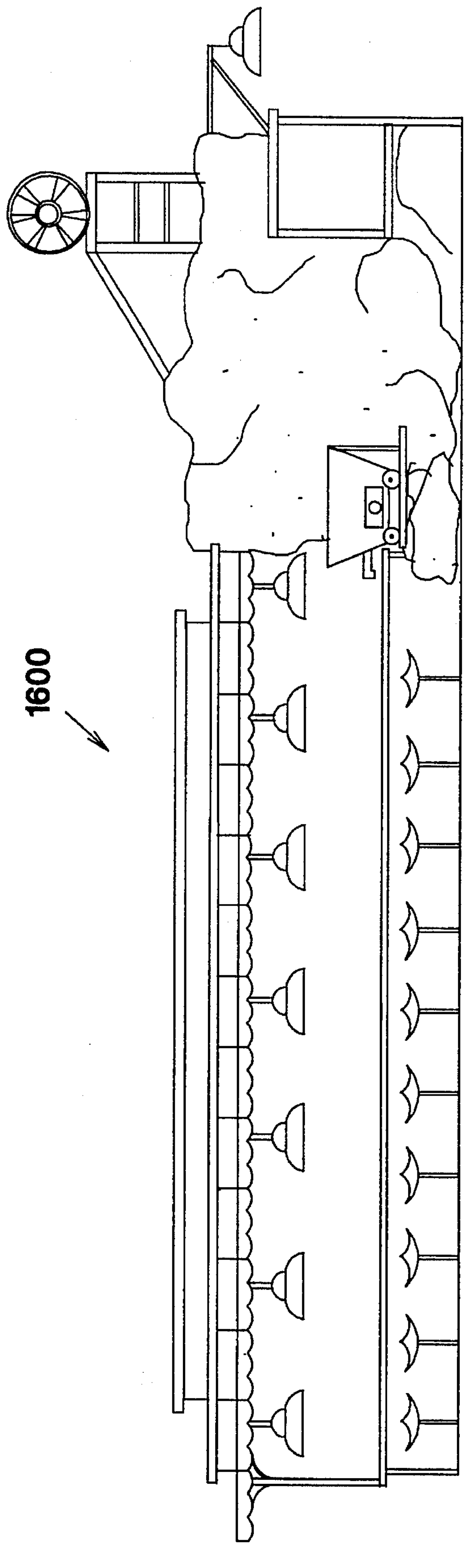
FIG. 12 is a side view of a single unit mining operation.

The self-contained mobile mining facility 10 of the instant invention, illustrated in FIG. 1, comprises two separate, interacting units which are connected during use and disconnected for transportation. The mining unit 12 and the sluicing unit 14 are designed to compactly contain all elements required for "successful" mining. The widths and lengths of the mining unit 12 and the sluicing unit 14 are preferably within the size requirements that allow for non-wide load transportation, eliminating the need for permits. In the preferred embodiment, the length of the mining unit 12 is approximately 20 feet and the length of the sluicing unit 14 is approximately 40 feet, providing a connected, overall length of approximately 62 feet. The width of both units is approximately 8 feet. These dimensions are provided for the purpose of implementing the maximum in usable space while allowing for easy transportation. The units can be scaled down, if easier transportation is required, however sufficient room must be left for the mechanics of the operation. Alternatively, the mining unit and sluicing units can be combined into one smaller sluicing operation unit 1600 of FIG. 12, for use in malls, carnivals, etc. The sluicing operation unit 1600 is a compact version of the dual units described herein and would contain the same equipment, slightly scaled down. Some pieces of equipment can be difficult or expensive to reduce in size and therefore the customer sluicing area provides the greatest opportunity for size reduction. Additional size reduction can be incorporated in the sales area. Obviously, if the instant invention is built for permanent installation, only the measurements critical for operation need be observed. For ease of description herein, reference is being made to a dual, mobile sluicing unit rather than a stationary unit, as the dimensioning is more critical due to size limitations. It should also be noted that multiple sluicing units can be operated off one mining unit, by the addition of multiple water returns. The ore with gemstone and/or gold combination is dispensed from a single location, thereby minimizing the equipment which requires altering for multi-sluicing units. In the illustrated embodiment, these two units are designed and decorated to transmit a theme. In the description herein, the old west mining theme is used, however other themes, such as futuristic or sci-fi, can easily be incorporated.

Figure 2:
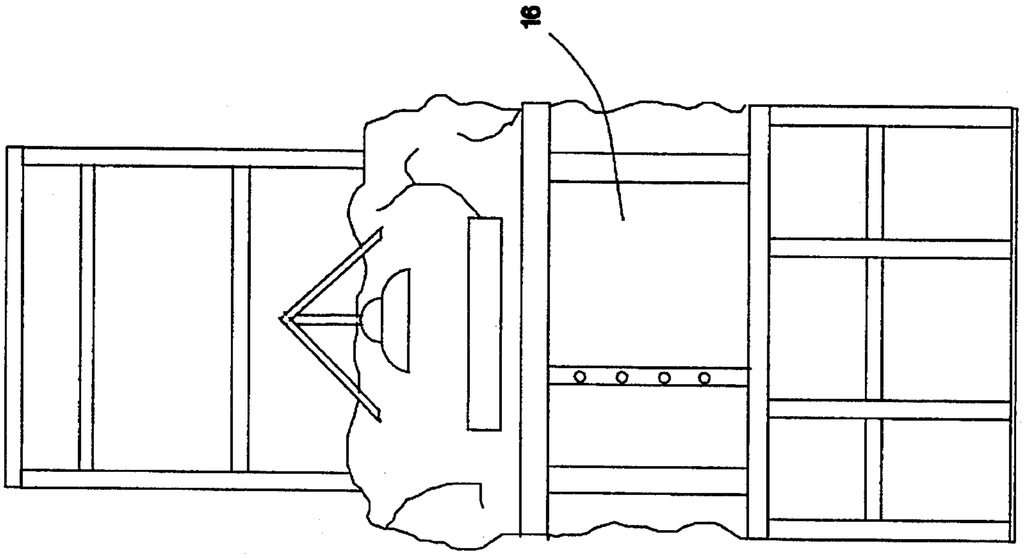
FIG. 2 is a end view of the sales unit of the sluicing operation of FIG. 1.

The mining unit 12 is designed to contain the sales area 16 and storage area 18. The sales area 16 can be used for ticket sales, retail sales, concessions, displays, etc. The mining unit 12, as illustrated, is designed as a hollow mountain with the sales area 16 recessed within as a "mine shaft". The sales area 16, illustrated in a front view in FIG. 2, is provided with access to the storage area 18, display shelving, etc. At least a portion of the storage area 18, generally over the sales area 16, preferably has two floors and sufficient storage bins, shelving, etc. to securely accommodate the required supplies during travel. The required operating machinery, described further herein, is housed within the storage area 18.

Figure 4:
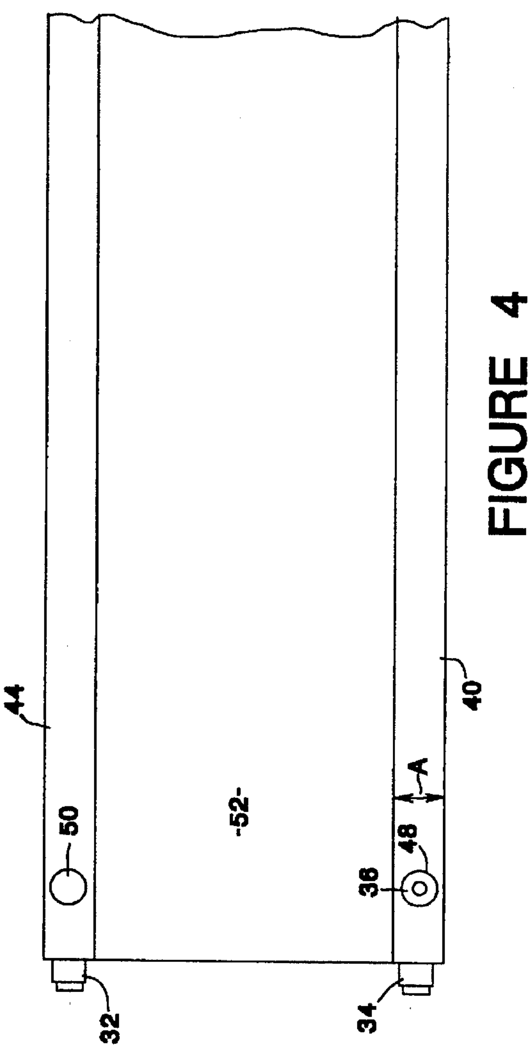
FIG. 4 is a top view of the troughs and return inlets.

The sluicing unit 14 is used as the customer mining area and is preferably provided with seating and overhead shelter designed in the appropriate theme. It is desirable to have a width of approximately 3 feet per person to prevent customers bumping into one another as they are mining. The sluicing unit 14 has declined troughs 40 and 44 on either side and an interior aisle 52 which allows an operator to move from one end of the sluicing unit 14 to the other end. The interior of the sluicing unit 14 is shown in greater detail in FIGS. 3 and 4. The sluicing troughs 40 and 44 extend the full length of the sluicing unit 14 and are pitched at a slight decline. This decline allows the water from the water supply pipe 20 to move along the troughs 40 and 44 in a river-like motion through gravitational pull rather than mechanical means. The optimum decline is preferably between 2° to 3° over a 40 foot length. A 2° slope allows the water to flow but does not place one end of the troughs 40 and 44 so far below the edge rail 24 as to be inaccessible. Alternatively, the sluicing unit 14 can be sloped at the same decline as the troughs 40 and 44, thereby maintaining an equal distance between the edge rail 24 and the troughs 40 and 44. The depth of the water level is preferably between ½ inch and 1½ inches. The ½ inch level provides sufficient water to remove the ore from the pans. More than 1½ inches provides no advantages and increases the weight of the water/ore combination which is recycled through the system. The instant invention, in its preferred embodiment, can handle greater than 1½ inches of water in the trough in the event a greater water depth is required. The water moves along the troughs 40 and 44 into water return pipes 42 and 46 (not shown). The water return pipes 42 and 46 can have clean-out access which is normally blocked by plugs 32 and 34. The clean-out access allows for the water return pipes 42 and 46 to be easily cleared in the event of blockage. Additionally, the receiving holes 48 and 50 should be provided with closure means such as plug 36. This allows for the water return pipes 42 and 46 to be shut off from the troughs 40 and 44. This is beneficial in the event of equipment failure, as the sluicing can continue in the non-recycling water, thereby prevent the complete shut down of the operation. Additionally, shutting off the flow of water from the troughs through use of the plugs 36, allows the water return pipes 42 and 46 to be easily cleaned without draining the system. Although the plugs 36 can be eliminated and the water return pipes 42 and 46 cleared through the receiving holes 48 and 50, this method is more time consuming and the water must first be drained out of the troughs 40 and 44 prior to cleaning. The ore and water combination passes through the receiving holes 48 and 50 into the respective water return pipes 42 and 46. The water return pipes 42 and 46 are placed at an decline in order to continue the water flow into the separation unit 58, shown in FIG. 5, in the storage area 18. Alternatively, the troughs 40 and 44 can be combined at the end and only one return pipe used. The separation unit is described in detail further herein. The interior aisle 52 provides the operator with the ability to assist the customers and instruct them on the sluicing operation.

In order to sluice the gemstones or gold from the ore, the user must swing the pan gently. In order to encourage the customer to use a side to side motion, it is critical that the width A of the troughs 44 and 40, illustrated in FIG. 4, be sufficiently narrow to prevent a forward and back motion. This is critical for several reasons. Economically, it is necessary for the speedy removal of ore, rotation of customers and prevention of damage to the pans. When the sluicing motion is across the width A of the troughs, the pans tend to hit into the sides of the troughs 40 and 44, damaging the pans. To provide sufficient width A to allow for forward and back motion of the pan, the troughs would have to be substantially wider, thereby increasing width of the sluicing unit 14. As stated heretofore, a permanent mining operation would not have the size restrictions and the troughs could be manufactured sufficiently wide enough to allow for the forward and back movement. An additional advantage to the side to side movement is water spillage. The more "enthusiastic" miner can cause the water to create waves which can cause spillage over the sides of the troughs in a forward and back movement. The side to side motion should be encouraged, as a depth to surface movement, i.e. taking the pan to the bottom of the trough then up to the surface, results in a circulation of the heavier elements from the bottom of the pan to the surface, increasing the chances of losing the ore/gold/gemstone combination over the edge of the pan.

The edge rail 24 can be provided with cups or indentations (not shown) to hold the stones which are mined from the ore The combination mining unit 12 and sluicing unit 14 are removably connected to one another through various means which are known in the prior art. Additionally the water return pipes 42 & 46 must be provided with disconnecting means to allow for complete disconnection of the two units.

The ore/water combination is returned through the water return pipe to the separator within the storage area 18. The water and ore are separated and the water is returned to the water supply pipe 20 where it is returned to the troughs 40 and 44. The troughs 40 and 44 can share a water supply through use of water supply pipe 20 or, alternatively, the water can be supplied through two water supply pipes 20 and 20*a* (not shown).

Figure 3:
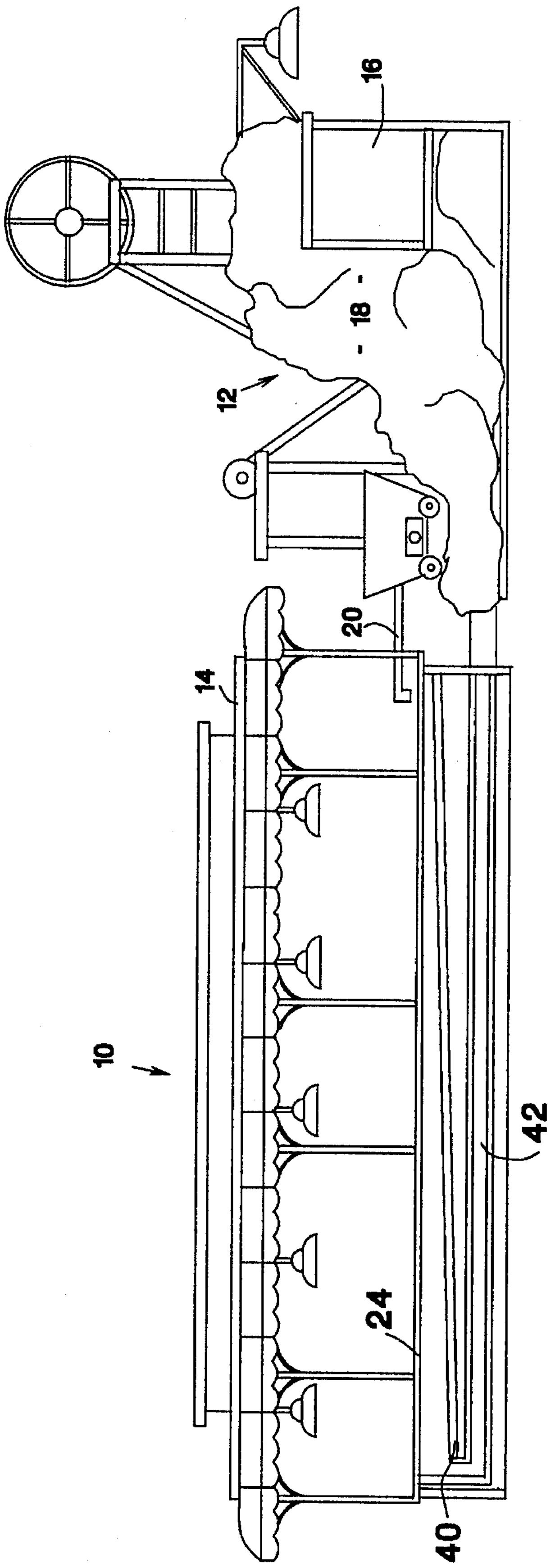
FIG. 3 is a cut-away side view of the portable sluicing operation of FIG. 1.
Figure 5:
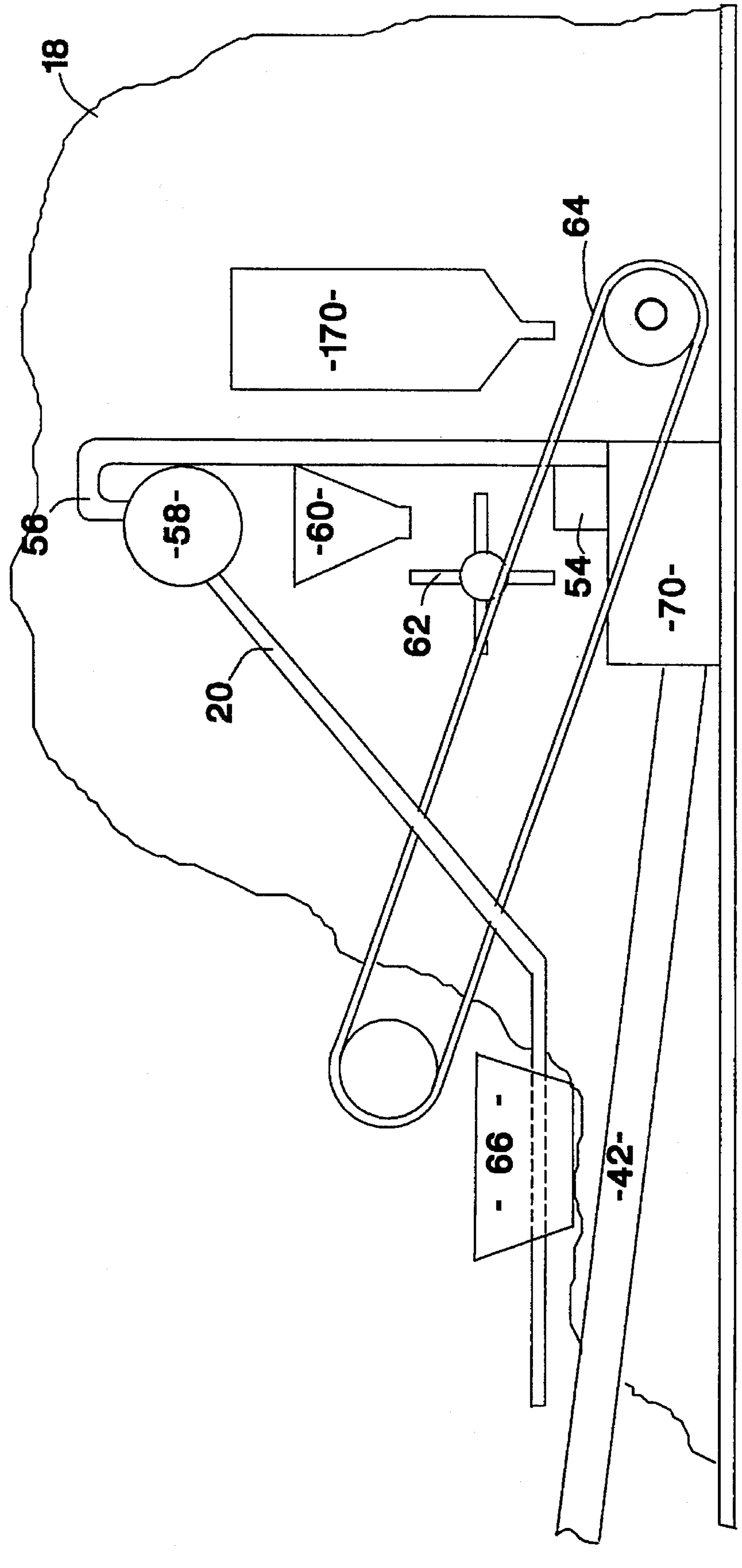
FIG. 5 is a side view of the machinery of the instant invention.

An example of the ore/gemstone processing arrangement is illustrated in FIG. 5. The ore/water combination is returned through return pipe 42 to a tank 70. The ore/water combination is continually pumped, using pump 54, through a transfer pipe 56 to the separator 58. The separator 58 can be any design of de-watering system which rapidly separates water and a solid material. A roller separator 58 is shown herein which has a design similar to that of a washing machine. The location of the separator is mostly dependent upon desired design, however if additional pumping facilities are undesirable, the separator should be placed at the highest point. In the illustrations of FIGS. 1 and 3, the separator is at the top of the mountain and used as part of the mining theme. The separated ore is released into a funneling bin 60 and the water is returned by gravity, to the troughs 40 and 44 through water pipe 20. The funneling bin 60 empties, at a predetermined, controlled rate, onto a weight or volume activated paddle wheel 62. The paddle wheel 62 is one method for measuring out a predetermined amount of ore and other weight activated methods can be employed. Optimally, the weight required to activate the paddle wheel, or other device, can be changed to allow for a change in the quantity of ore delivered. The paddle wheel 62 releases once the predetermined weight is achieved, depositing the ore onto the conveyor 64 where it is transported to the ore cart or dispensing bin 66. The gem bin, or material holding bin 170, illustrated in further detail in FIG. 7, dispenses gemstones or precious materials onto the conveyor 64 at a predetermined ratio to the ore. Although it is not critical to arrange the placement of ore and gemstones along the conveyor, it is critical that the determined ratio between the gemstones and ore be accurate. Both the unit dispensing the ore and the unit dispensing the gemstones should be adjustable to vary the ratio between the ore and gemstones. This allows for the ratio to be increased for less expensive stones and decreased for gold. The ore and gemstones are naturally mixed as they are dropped into the ore cart or dispensing bin 66. If desired, a mixer can be installed in the cart to maintain a constant mixing of the stones and ore. The ore/gemstone combination is dispensed to the customers directly from the ore cart or dispensing bin 66. The ore cart 66 can be provided with an internal measuring device which dispenses a predetermined amount in response to a token or an attendant can measure out the ore on a scale and place it into a bag. Alternatively, the bags can be sized to hold a predetermined quantity of ore/gemstone/gold combination, the price of each bag being determined by bag size.

The gem bin or material holding bin 170, as illustrated in FIG. 7, is used for storage of the gem stones to be mixed with the ore. The gem bin or material holding bin 170 is equipped with an auger 174 at the dispensing point 176. The stones filter down through the storage section 172 and are caught in the auger 174. The auger 174 controls the flow of the gemstones through the number of rotations, therefore enabling a predetermined quantity of gemstones to be placed onto the conveyor 64. The auger 174 can be activated on either a time basis, so many revolutions per time span, or it can be activated by the paddle wheel 62. The use of the auger 174 is only one way to measure out and place the gem stones onto the conveyor belt 64 and other means, such as a rotating cup device, can be used based on manufacturing costs and number of customers.

The gold and gemstones are separated from the ore through use of a mining pan. In order to assure that the customers will be able to experience the feel of mining without the skill required to use a real pan, the pan must be carefully configured. Actual gold mining pans are shallow metal, or plastic, pans and the gold is separated from the dirt by swirling water around in the pan, washing out the dirt while maintaining the gold. Rapid, successful sluicing for gold is not something which can be accomplished without practice. The instant mining pan, as disclosed in FIG. 7 is a curved rim pan with broad rim 1002 to retain the ore within the base 1004. The base 1004 is provided with round sieve holes 1006 to allow the ore to pass through. A chain 1008 is attached at one end to the pan 1000 and at the other to the sluicing unit. The chain 1008 not only prevents theft but prevents the customers from lifting the pan 1000 onto the side of the sluicing unit 14 and going through the ore piece by piece.

The ore of the instant disclosure is a specifically engineered product which must meet certain specifications. The dimensioning of the ore, sieve holes 1006 and gem stones is critical. The ore dimensions must be in a range to interact with both the ore separator and the sieve holes 1006. An example of optimum dimensioning would be grain sizes between approximately 3/32" and 11/32" diameter. The grains should be approximately 1/32" larger than the ore separator holes and approximately 2/32" smaller than the panning screen holes. Any combination of ore and hole sizes that holds to this ratio of dimension would be adequate. This allows for the ore to pass through the sieve holes 1006 with movement but prevents the ore from just filtering through. The sieve holes 1006 must not be so large as to allow the ore to readily flow through, but rather should be slightly larger than the diameter of one grain. This dimensioning prevents blockage by more than one grain from passing through a single sieve hole 1006 at a time. The sieve holes 1006 can be altered to control ore flow. As a commercial operation, the time each person spends mining for gold or gems must be kept relatively rapid. However, if the ore flows too readily through the sieve holes 1006, there is no challenge to the panning. Using the above dimensions, it takes the customer approximately 3 to 5 minutes per 10 to 12 pound bag of ore.

The term ore is used herein as a generic term. The ore can be any substance which could give the aesthetic feel of mining and fulfill the operational parameters set forth, can be used. This can be pebbles, natural sand, tumbled brick chips, glass or plastic beads, etc. The material must have sufficient weight to prevent the material from floating and to provide the "feel" of real "pay dirt". The ore of the instant disclosure is without angular edges and, when using natural materials, they should be polished to smooth out any angular edges and crevices. Most most natural materials are not uniformly smooth, and also not clean enough to meet EPA standards. To prepare the natural material, the mined material is first placed through a rough classification process. The first sifting eliminates the pieces which are either too small or too large to reach the desired dimensions. The remaining material is processed in a tumbler with water and a suitable grit, such as silicon carbide, for 3–5 days. The ore can be tumbled without the grit, however this increases the tumbling time substantially. The tumbled material is resifted to eliminate those grains which, through the removal of the rough edges, have become smaller than desired. The completed material is slippery and resembles polished pebbles. The smooth material not only eliminates natural dirt that had accumulated in crevices prior to processing, thereby keeping the water clear but prevents abrasion of the machinery, a critical area of concern. Additionally, the smooth, polished material will not clog the equipment as does extremely fine sand. The ore size and glossy surface set forth above, serves as a preferred size as it provides enjoyable sluicing while rotates customers at a sufficient pace to make the operation economically feasible while providing optimum interaction with the equipment. The careful processing of the ore not only lessens equipment wear but provides environmental advantages. The water in the instant invention should be treated as in a swimming pool and should meet the same BOD standards as a pool. Treatment of the water prevents the bacterial content passed from people to the water from multiplying. As stated heretofore, the EPA regulations are quite stringent on waste water which is re-entering the environment. The ore meeting the requirements of the instant invention deposits so little residue, if any, that the separated water is relatively unchanged and may, in some instances, be cleaner than prior to use. The instant invention is designed to recycle the water and ore, however if the portable units wish to dispose of the water prior to moving the water has a purity which allows it to be put into streams, sewers or used to water lawns. Water used in prior art systems, due to the high clay and silt content of the unprocessed sand or dirt, must first be placed in primary, secondary and preferably tertiary settlement basins prior to being reused or discharged.

Figure 8:
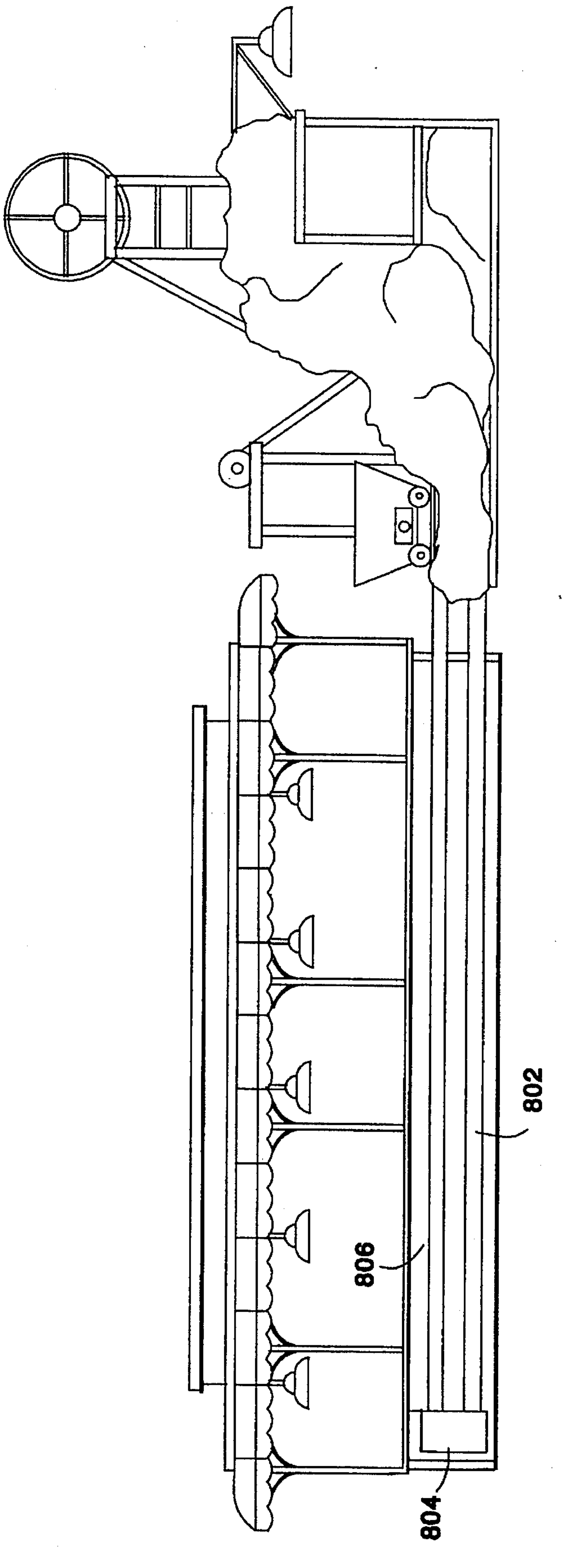
FIG. 8 is a cut-away side view an alternate embodiment of the portable sluicing operation.

An alternative embodiment to the sluicing system of FIG. 3 is illustrated in FIG. 8. The water supply 802 runs along the bottom of the sluicing unit 800 and pumped up to the troughs 806 through use of pump 804. The water/ore combination is then returned to the storage area 808 where the water and ore are separated. This configuration provides the advantage that the ore/water combination is transported only one length of the sluicing unit 800, thereby lessening the wear of equipment. Dependent upon the degree of descent, length of travel, placement of water sources, etc. hydrology can be utilized alone or in combination with pumps. The arrangements disclosed herein provide examples and are not intended to limit the scope of the invention.

The mining of gold dust can incorporate alternate mining tables which allows for optimum entertainment while being economically profitable. In one gold dust mining embodiment, a separate mining table 1100 is equipped with a screen 1104 which is placed midway between the base 1108 and the open top. The screen 1104 is securely affixed to the sides 1110 of the mining table 1100 through means well known in the art. Water 1106 is filled to cover the screen 1104 and must have sufficient depth to allow for gold sluicing while being far enough below the open top to prevent water from washing over the sides 1110. Gold is generally found in black sand and the black sand 1102 and gold dust can be automatically mixed with the instant ore as described heretofore, substituting gold dust for the gemstones. The bags of black sand/gold and ore can be purchased in the same manner as the ore/gemstone combination. The user pans for the gold at the mining table 1100, washing the ore from the gold dust and black sand. The panned ore filters through the screen 1104 to rest on the base 1108 of the mining table 1100. The screen 1104 must be constructed with a mesh which allows for easy migration of the ore and black sand 1102. The black sand and ore 1102, with the unremoved gold dust, is removed from the mining table 1100 after hours. Several methods can be employed for easy sand removal, i.e. removable screen or funnel shaped base 1108. The screen 1104 prevents the customers from having access to the ore 1102 and continuing to remine the ore 1102. Standard gold mining pans can be used or, as an alternative the aforenoted pans can be modified for use with sand. To alter the pans, the average dimension of the sand must be determined and the holes in the bottom of the pan proportioned to obtain the foregoing ratio. The mining table 1100 can be used in conjunction with, or separate from, the previously disclosed mining operation. The mining table can be provided with a canopy, stools, etc. to maintain a desired theme.

Figure 11:
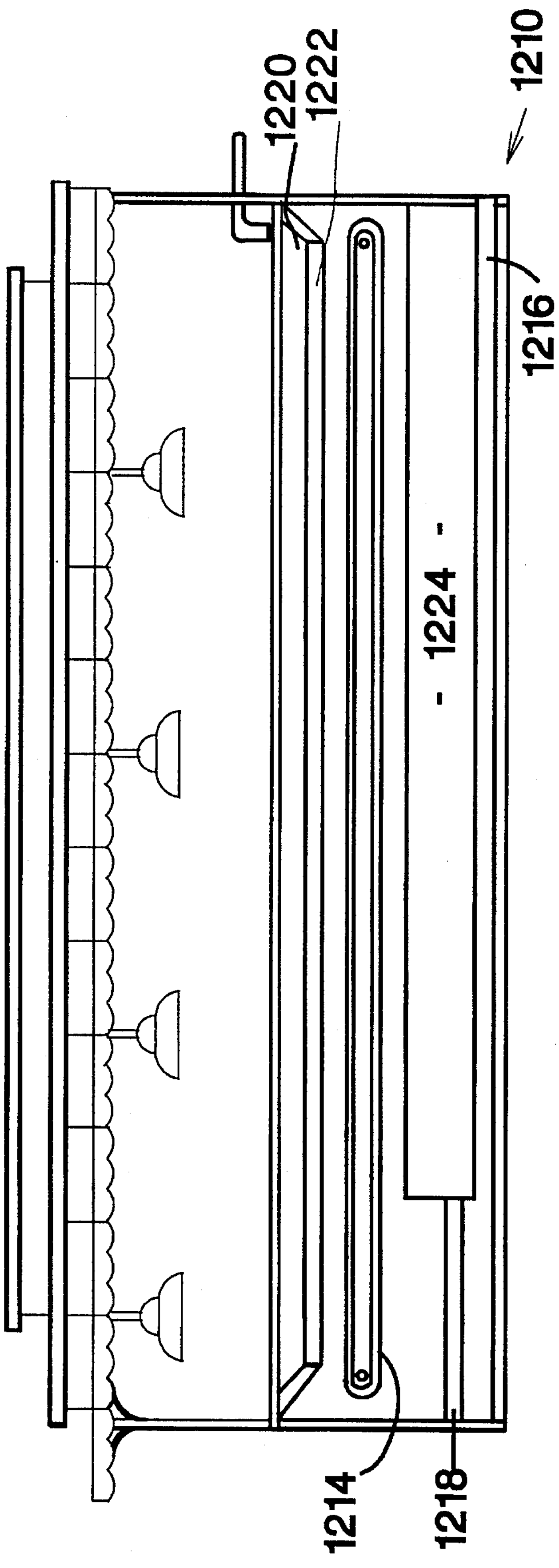
FIG. 11 is a cutaway side view of an alternate sluicing operation.

An alternate to the mining table 1200 is illustrated in FIG. 11 wherein the trough 1220 of sluicing unit 1210 has a mesh bottom 1222 to allow for the migration of the ore. The ore, black sand and unrecovered gold dust filter through the mesh bottom 1222 to the conveyor 1214. The constantly moving conveyor 1214 deposits the ore and black sand/gold dust into the retaining box 1212 for removal at a later time. The retaining screen 1218 allow the majority of the water to separate from the ore and enter the return pipe 1216, where it is pumped, filtered and returned to the system. The enclosure bottom 1224 serves to retain the water in a confined area along the path of the conveyor 1214.

An in-ground, permanent, gold mining river can also be created using the same basic concept. An artificial river is created from an existing sloped area that would lend itself to be turned into a riverbed. The instant disclosure uses a waterfall, river containing filtration dams, and retaining pool to complete a full recycling cycle, however any combination can be used. In the instant disclosure, the water plunges down a waterfall, runs along the riverbed, through one or more filtration dams, to the retaining pool. The water is again filtered, and pumped back up to the waterfall. The desired filtration levels of the water should be sufficient to meet BOD requirements for swimming pools. It is recommended that a back-up pumping system be provided as a failure of the pumping system for any length of time would allow for excessive organic growth.

In order to prepare a controlled, recirculating river system, which meets the requirements of the instant disclosure, the selected areas must be cleared of all small rock, clay and soil, thereby exposing the native bedrock. If the depth of clay and regolith precludes the practicality of such excavation then an artificial bed can be constructed of concrete, or other suitable impermeable materials. The bedrock should be sealed to prevent seepage and the overall topology created. The return pumping system, housing, water supply, etc. should also be constructed at this point.

To prevent debris, algae and loose article build-up in a large recycled system, pollution free, passive filtration systems are provided along the length of the river. These filtration systems must be readily accessible and durable while blending with the landscape.

Figure 9:
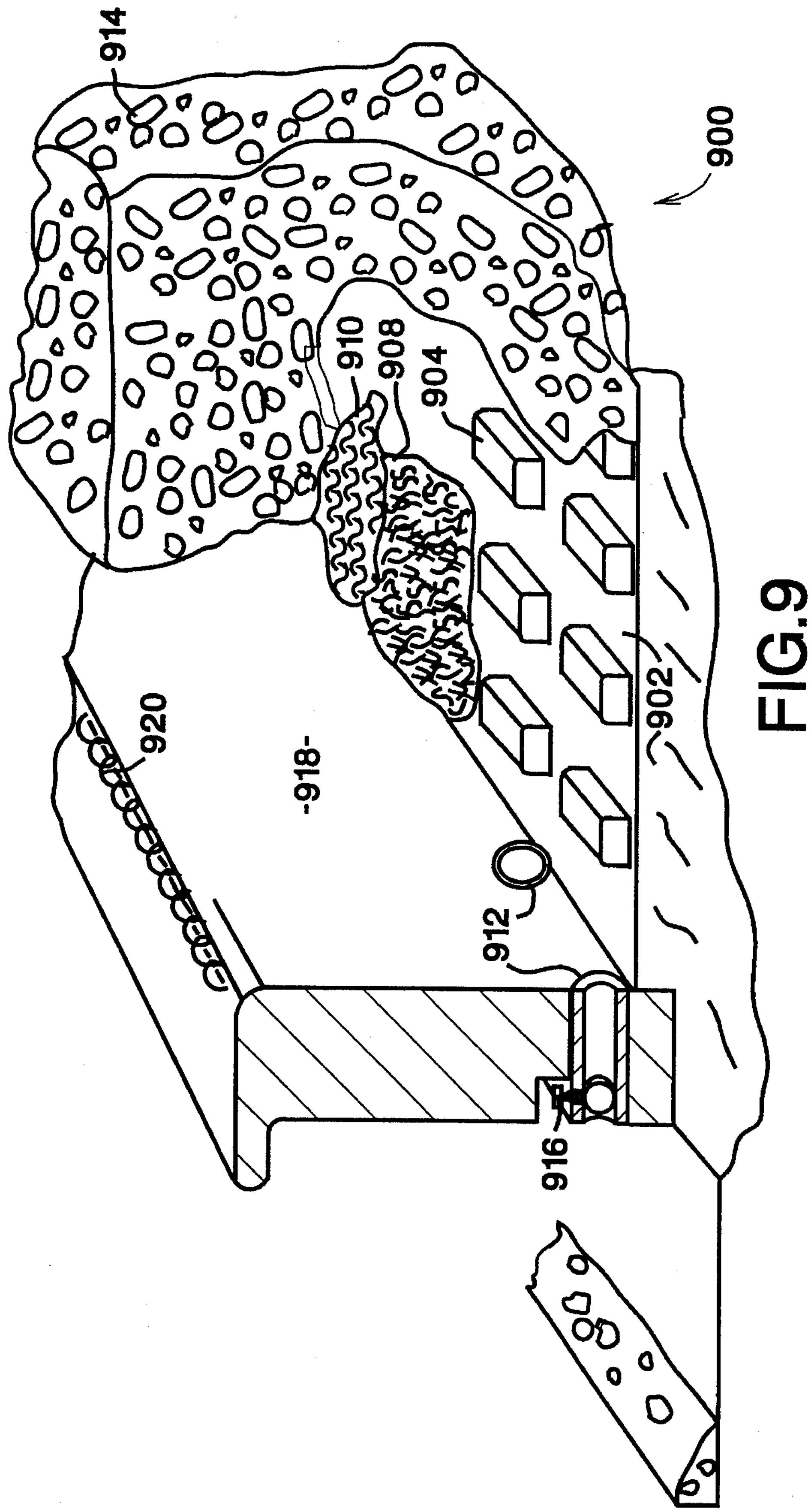
FIG. 9 is a cut-away perspective view of the filtration system of the artificial river bed of the instant invention.
Figure 10:
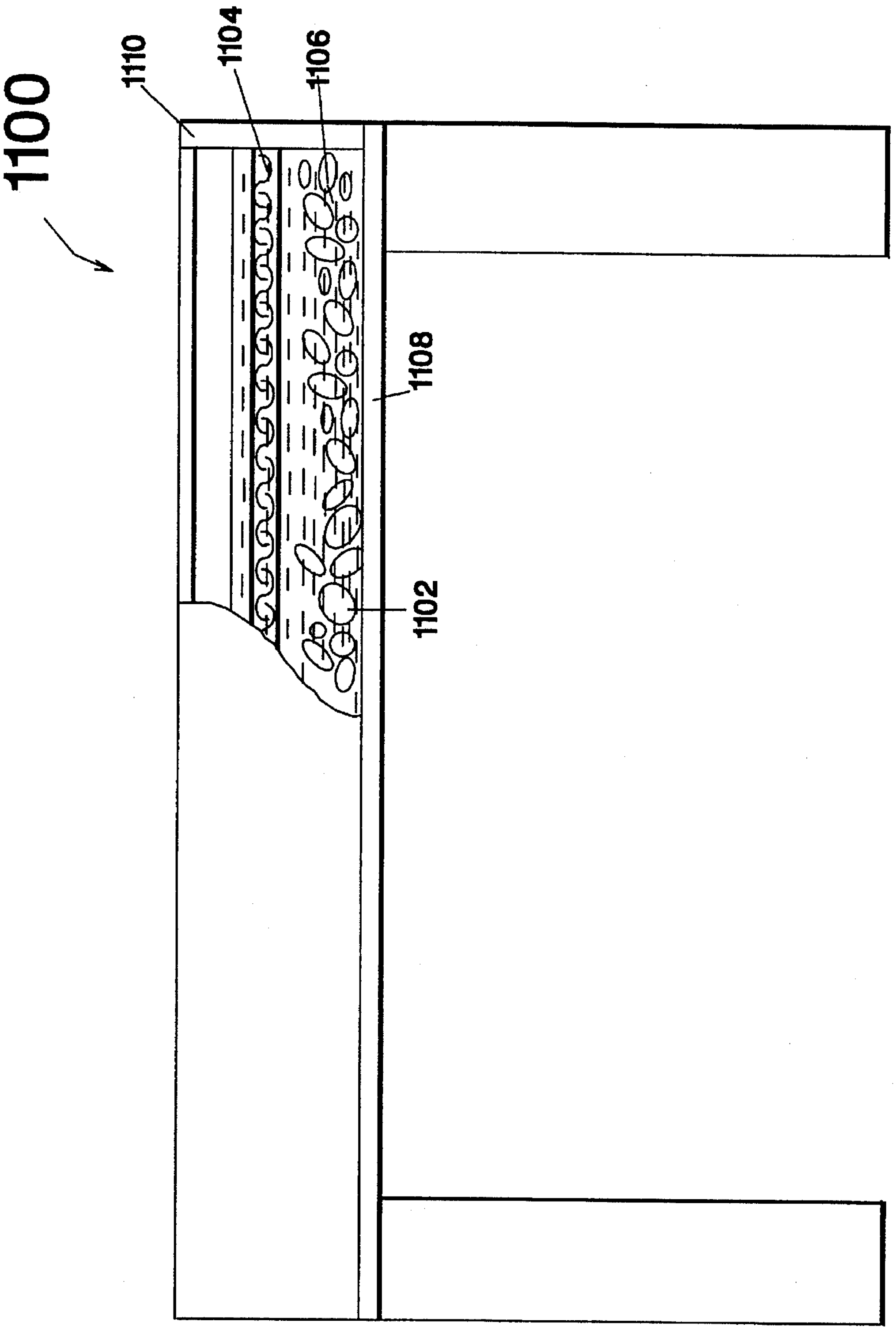
FIG. 10 is a side view of a gold dust mining table.

FIG. 9 illustrates the disclosed passive filtration system 900, wherein the artificial river has been cleared down to the bedrock 902 and sealed. Passive filtration dams 918 are placed along the river at predetermined intervals. The distance between the dams 918, as well as the number of dams 918, is determined by the length and drop in elevation of the river, foliage and use. The dams 918 have a number of inlet ports 912 along the bottom which extend through the dam 918. There should be an adequate number of inlet ports 912, with an aggregate diameter, to allow for up to approximately 200% of the water to pass through. Alternatively, the dams 918 can have one inlet port 912 of an appropriate sizing. The dams 918 have a height approximately equal to the distance from the bedrock 902 to the surface of the water. Aesthetically, a portion of the water should flow over the dam 918. For maximum filtration the majority of the water should flow through one or more of the inlet ports 912 by the completion of the flow cycle. The dams can be constructed from native stone, concrete, bricks, plastics or any wear-resistant, waterproof material. The dam 918 preferably conforms to the side of the river bed to prevent substantial water passage around the sides of the dam 918. The top of the dam 918 should be provided with a surface debris catcher 920 to catch and retain the lose leaves, branches, etc. Multiple rows of bricks 904 are affixed to the bedrock by concrete or other means known in the art. The bricks 904 can be standard bricks, cobblestone, concrete or any other wear-resistant material. The bricks 904 serve to create a cavity for water collection and to direct the flow into the inlet ports 912. The bricks 904 are covered with commercial filtration matting 908 and serve to keep the matting off the bedrock. The commercial filtration matting 908 filters and traps the impurities which are contained in the flowing water. The filtration matting 908 builds up a bacterial population which digests any organic wastes and purifies the water of suspended solids. The filtration matting 908 then is covered with a protective overlay of heavy gauge rigid matting 910. The rigid matting 910 prevents the filtration matting 908 from being torn by the rocks or gold rushers or from being displaced by the water flow. A height of 2" would serve in most applications, however, the height of the matting 910 can be changed based on size of the river, activity, required filtration etc. The height of the bricks 904 should be greater than that of the inlet ports 912, thereby raising the filtration matting 908 above the inlet ports 912. Thus, the water is filtered through the filtration matting 908 prior to entering the inlet ports 912, accumulating the organic particles and silt within the filtration matting 908. The rigid matting 910 is covered with the gemstone and gold enriched washed sand and gravel fill 914 which is used to fill the river bed. Each of the inlet ports 912 is equipped with a control valve 916 which controls the rate of water discharge from 0% to 100%. The gate valves 916 can be either manually operated or electronically controlled. There are obvious advantages to electronically controlled gate valves 916, however in areas where cost is a major concern and little variation in water flow expected, manual gate valves 916 can be used. Where the water level frequently increases rapidly, such as with heavy thunderstorms, it is advantageous to use electronic valves in conjunction with automatic sensors. Maximum filtration is also desirable to clean the water after storms prior to customer use. The retaining pool should also be constructed to allow for additional water storage. The amount of water flow required can be determined by a county agent or hydrologist.

The filtration system 900 can be cleaned by shutting down the pumping system, opening all upstream gate valve 916 and allowing the river to drain downstream to the retaining pool. The sand and gravel fill 914 is removed from the filtration area and the filtration matting 908 cleaned.

The foregoing filtration is used as an example of a simple, natural system. Other filtrations systems which incorporate the basics disclosed, can be utilized where required by natural or use conditions.

The sand and gravel forming the river bed can be varied in height, according to topography and use, and provides further filtration. The sand and gravel filter the water in the same way a swimming pool or water system filter is used commercially. The ratio of sand to water is, however, so high that filtration many times that of commercial systems is provided. The high filtration capacity of the instant invention also allows the system to be used to clean polluted natural streams. The use of the filtration dams is a economical method of filtering out many pollutants and return streams to acceptable water purity standards. The number of dams required for a particular stream can be determined by a person versed in EPA regulations.

The washed sand and gravel fill 914 must be sufficiently free of excessive clay and silt to prevent clogging the filtration matting 908. The use of standard gold mining pans eliminates the need for the extreme grain size restrictions required in the foregoing smaller mobile mining facility 10. Portions of the artificial river can be provided with the processed ore disclosed heretofore, and the disclosed pans used in conjunction with gemstones. In applications relying on predominately gold mining, the use of black sand contrasts with the gold and makes mining easier for the customer, as well as more realistic.

The artificial river can be used for preservation purposes as well. An artificial eco-system is naturally created for a variety of aquatic creatures, as well as the animals they support. Separate areas are created within the river through the use of the dams. The dams can be equipped with devices to allow for the precise monitoring of the water and bacteria. The water will be filtered prior to entering the subsequent area and specialized food can be added, if desired, at that point. The ability to safely control the filtration flow allows for all the water to be filtered, or excluded, in case of a rapid increase in an undesirable outside water source, such as run-off from heavy rains. Additionally, water levels can be controlled, thereby affecting the water temperature and controlling the water to bacteria ratio. As an example, approximately one third of the known species of fresh water mollusks are on or near the endangered species list. Protected breeding rivers can be established for the endangered mollusks to breed sufficient quantities for return to their natural state. Several compatible species can be mixed within each partitioned area and incompatible species requiring the same climatic conditions can be "housed" in adjacent areas. A mix of species can be provided within a single artificial river with the commercial species supporting the non-commercial, endangered species. For example, using the disclosed river for culturing fresh water pearls would make providing a refuge for snail darters a financially profitable endeavor. The river can also be used as a feeding area for various types of birds by encouraging their favorite food to safely breed within the river. The system can also be used for saltwater, with the blending, mixing and monitoring of the salt to water ratio being done at the main filtration and pumping station.

The instant river can also be used for hydrophonics, an area of growing popularity.

Since other modifications and changes varied to fit particular operating requirements and environments will be apparent to those skilled in the art, the invention is not considered limited to the example chosen for the purposes of disclosure, and covers all changes and modifications which do not constitute departures from the true spirit and scope of this invention.

What is claimed is:

1. A self-contained, simulated mining apparatus which allows users to mine for precious materials as a means of entertainment, said apparatus having:

ore, said ore having a relatively uniform size and being free of residue, precious materials, said precious materials having a size greater than said ore, water, storage facilities, said storage facilities containing:

an ore precious material dispensing bin, a water/ore separation means, said separation means separating the ore and water, a precious material holding bin, said material holding bin further comprising measuring means, a first conveyor, an ore retaining area, said ore retaining area being proximate said water/ore separation means, ore measuring means, said ore measuring means being proximate said ore retaining area and said conveyor, at least one pumping means, a first water transfer means, said first water transfer means connecting said pumping means to said separation means, at least one water dispensing means, said water dispensing means being connected at a first end to said water/ore separation means, said material holding bin and measuring means is proximate said conveyor and deposits said material onto said conveyor; said ore measuring means is proximate said conveyor and deposits said material onto said conveyor and said conveyor transports said material and said ore to said ore/material dispensing bin, dumping said ore and material into said ore/material dispensing bin, at least one sluicing facility, said at least one sluicing facility having:

at least one trough, said at least one trough having a first end, a second end and a length, said length extending along at least a portion of the periphery of said sluicing facility and being sufficient to seat at least one person, said first end of said trough receiving water from said water dispensing means, at least one water/ore return means, said water/ore return means receiving water from said second end of said trough, wherein the water/ore combination from said trough flows through said water transfer means and is pumped through said water transfer means to said water/ore separation means, the separated ore is placed in said ore retaining area to be measured by said ore measuring means and deposited on said conveyor and said water flowing from said water/ore separation means flows through said water dispensing means to said first end of said trough, thereby continually recycling said ore and water.

2. The simulated mining apparatus of claim 1 wherein said precious material has a perceived value.

3. The simulated mining apparatus of claim 1 wherein said material is gold.

4. The simulated mining apparatus of claim 1 wherein said material is gemstones.

5. The simulated mining apparatus of claim 1 wherein said trough is at about a 2° angle.

6. The simulated mining apparatus of claim 1 wherein said ore measuring means measures the ore by weight.

7. The simulated mining apparatus of claim 1 wherein said ore/material dispensing bin further comprises dispensing means to dispense a predetermined quantity of ore/material combination.

8. The simulated mining apparatus of claim 1 further comprising a mesh, said mesh forming the bottom of said trough, said mesh allowing said ore and water to filter through onto a second conveyor, said second conveyor being proximate said mesh to receive said ore.

9. The simulated mining apparatus of claim 8 further comprising ore receiving means, said ore receiving means having filter means to prevent ore received from said first conveyor from leaving said ore receiving means.

10. The simulated mining apparatus of claim 9 wherein said at least one water return means connects said ore receiving means to said pumping means.

11. The simulated mining apparatus of claim 1 further comprising a plurality of sluicing pans, each of said sluicing pans having flared sides, a substantially flat perforated base, and a chain connecting said sluicing pan to said sluicing facility.

12. The simulated mining apparatus of claim 1 wherein said ore is a natural material polished to remove angularities and residue.

13. The simulated mining apparatus of claim 1 wherein said ore is a synthetic material.

14. The simulated mining apparatus of claim 1 wherein the diameter of the majority of said ore is between approximately $\frac{2}{32}$ and $\frac{12}{32}$ of an inch.

15. The simulated mining apparatus of claim 11 wherein said sluicing pan has perforations slightly greater than the diameter of the grains of ore.

16. The simulated mining apparatus of claim 15 wherein said perforations are approximately $\frac{13}{32}$ of an inch.

17. The simulated mining apparatus of claim 1 wherein said storage facility and said sluicing facility are removably connected.

18. The mining apparatus of claim 1 wherein said storage facility and said sluicing facility are dimensioned to be transported by trucks.

19. The method of sluicing for precious materials as entertainment, using a self-contained, simulated mining apparatus having:

storage facilities, said storage facilities containing:

a predetermined quantity of water, a predetermined quantity of ore, an ore precious material dispensing bin, water/ore separation means, said separation means separating ore and water, a precious material holding bin, said material holding bin further comprising measuring means for dispensing a predetermined amount of material, at least one conveyor, an ore retaining area, said ore retaining area being proximate said water/ore separation means, a first water transfer means, ore measuring means, said ore measuring means being proximate said ore retaining area and said conveyor, an ore/material dispensing bin, at least one pumping means, at least one water dispensing means, said water dispensing means being connected at a first end to said water/ore separation means, at least one sluicing facility, said at least one sluicing facility having:

at least one trough, said at least one trough having a first end, a second end and a length, said length extending along at least a portion of the periphery of said sluicing facility and being sufficient to seat at least one person, said trough having a 2° decline from said first end to said second end, at least one water return means, said at least one water return means being proximate said second end of said trough, multiple sluicing pans, each of said multiple sluicing pans having about flared sides, a chain connecting said pans to said sluicing facility, and a substantially flat perforated base, the perforations in said base being dimensioned slightly larger than said ore, comprising the steps of:

placing an initial quantity of ore into said ore retaining area bin, placing an initial quantity of water into said at least one trough, said quantity be sufficient to maintain water constantly moving from said first end to said second end of said at least one trough, placing an initial quantity of said material into said material holding bin, placing an initial quantity of ore/material combination in said ore/material dispensing bin removing a quantity of ore/material combination from said ore/material dispensing bin, placing said ore/material combination in said sluicing pan and separating said ore from said material by moving said sluicing pan in the moving water within said troughs, said ore filtering through said pan perforations, retaining said precious material within said sluicing pan, combining said separated ore with said water within said troughs, moving the ore/water combination along said troughs to said water return means, moving said ore/water combination along said water transfer means to said pumping means, pumping said ore/water combination to said water/ore separation means, separating said water and ore, returning said water to said water dispensing means after separation, returning said ore to said ore retaining area after separation, whereby users are able to mine for precious materials at said troughs using said sluicing pans.

20. The method of sluicing for precious materials of claim 19 wherein said ore/material dispensing bin further comprises dispensing means to dispense a predetermined quantity of ore/material combination.

21. A self-contained, simulated mining apparatus which allows users to mine for precious materials as a means of entertainment, said apparatus having:

ore, said ore having a relatively uniform size and being free of residue and a majority of said ore having a diameter between approximately 2/32 and 12/32 of an inch, precious materials, said precious materials having a size greater than said ore, and having a perceived value, water, storage facilities, said storage facilities containing:

an ore precious material dispensing bin, said ore/material dispensing bin having dispensing means to dispense a predetermined quantity of said ore/material combination a water/ore separation means, said separation means separating ore and water, a material holding bin, said material holding bin further comprising measuring means, at least one conveyor, an ore retaining area, said ore retaining area being proximate said water/ore separation means, ore measuring means, said ore measuring means being proximate said ore retaining area and said conveyor, at least one pumping means, a first water transfer means, said first water transfer means connecting said pumping means to said separation means, at least one water dispensing means, said water dispensing means being connected at a first end to said water/ore separation means, said material holding bin and measuring means is proximate said conveyor and deposits said material onto said conveyor; said ore measuring means is proximate said conveyor and deposits said material onto said conveyor and said conveyor transports said material and said ore to said ore/material dispensing bin, depositing said ore and material into said ore/material dispensing bin, at least one sluicing facility, said at least one sluicing facility having:

at least one trough, said at least one trough having a first end, a second end and a length, said length having a 2° decline and extending along at least a portion of the periphery of said sluicing facility and being sufficient to seat at least one person, said first end of said trough receiving water from said water dispensing means, at least one water/ore return means, said water/ore return means receiving water from said second end of said trough, a plurality of sluicing pans, each of said sluicing pans having flared sides, a substantially flat perforated base, the perforations in said base having a slightly greater diameter than said ore, and a chain connecting said sluicing pan to said sluicing facility, wherein the water/ore combination from said trough flows through said water return means and is pumped through said water transfer means to said water/ore separation means, the separated ore is placed in said ore retaining area to be measured by said ore measuring means and deposited on said conveyor and said water flowing from water/ore separation means flows through said water dispensing means to said first end of said trough, thereby continually recycling said ore and water.

* * * * *